United States Patent

Scherzer et al.

[15] 3,676,368

[45] July 11, 1972

[54] RARE EARTH-HYDROGEN EXCHANGED ZEOLITES

[72] Inventors: Julius Scherzer, Baltimore; Edwin W. Albers, Annapolis, both of Md.

[73] Assignee: W. R. Grace & Co., New York, N.Y.

[22] Filed: Aug. 26, 1970

[21] Appl. No.: 67,284

[52] U.S. Cl. ........................................... 252/455 Z, 23/111
[51] Int. Cl. .................................. B01j 11/40, C01b 33/28
[58] Field of Search ............................................. 252/455 Z; 23/111–113

[56] References Cited

UNITED STATES PATENTS 3,393,147   7/1968   Dwyer et al ..................... 252/455 Z
3,459,680   8/1969   Plank et al ........................ 252/455 Z

*Primary Examiner*—C. F. Dees
*Attorney*—Arthur P. Savage and Kenneth E. Prince

[57] ABSTRACT

Alkali metal faujasite having a silica to alumina ratio in excess of about 3 is rate earth exchanged in an acid media at a pH of about 3.0 to 3.5, calcined, and washed to reduce the alkali metal oxide content thereof to a low level. The exchanged faujasite contains 6 to 14 percent by weight rare earth oxide and a concentration of hydrogen ions which imparts the desired catalytic activity. The present rare earth-hydrogen faujasite finds utility as a hydrocarbon conversion catalyst, and particularly as an ingredient in catalytic cracking catalyst compositions.

12 Claims, No Drawings

RARE EARTH-HYDROGEN EXCHANGED ZEOLITES

The present invention relates to the preparation of catalytically active zeolites, and more specifically to a rare earth-hydrogen exchanged faujasite which possesses a high degree of catalytic activity and thermal stability.

Rare earth exchanged faujasites which contain both rare earth and hydrogen ions have been suggested for use as hydrocarbon cracking catalysts. Typical prior art rare earth-hydrogen exchanged zeolites contain a relatively high concentration of rare earth ions which impart the desired thermal stability characteristics necessary for high temperature catalytic applications.

It is found, however, that rare earth-hydrogen exchanged faujasites which contain high concentrations of rare earth ions considered necessary for maximum thermal stability, possess somewhat less than desired catalytic activity and selectivity when used as hydrocarbon cracking catalysts or components thereof.

Furthermore, faujasite catalyst compositions which contain high concentrations of rare earth ions are expensive to produce from the standpoint of both material cost and processing cost.

It is therefore an object of the present invention to provide an improved rare earth-hydrogen exchanged faujasite.

It is a further object to provide a catalytically active rare earth-hydrogen exchanged faujasite which possesses a high degree of thermal stability and hydrocarbon cracking activity.

It is still another object to provide a thermally stable rare earth-hydrogen exchanged faujasite which contains a relatively low concentration of rare earth ions and which exhibits a high degree of catalytic cracking activity and desired selectivity.

It is yet a further object to provide an improved method for preparing rare earth-hydrogen exchanged faujasite and improved hydrocarbon conversion catalyst therefrom.

It is still a further object to provide hydrocarbon cracking catalyst compositions which contain improved rare earth-hydrogen exchanged faujasite.

These and still further objects of the present invention will become readily apparent to one skilled in the art from the following detailed description and specific examples.

Broadly, our invention contemplates a rare earth-hydrogen exchanged faujasite which contains rare earth ions in amounts of about 6 to 14 percent by weight measured as rare earth oxide ($RE_2O_3$), and a high concentration of hydrogen ions.

More specifically, we have found that a novel, thermally stable, and catalytically active rare earth hydrogen exchanged faujasite may be prepared by:

1. Exchanging sodium faujasite having a silica to alumina ratio of about 3 to 6 with an aqueous solution of rare earth ions at a pH of about 3.0 to 3.5 to impart a rare earth ion concentration in amounts ranging from about 6 to 14 percent by weight measured as $RE_2O_3$, and a sodium ion concentration of about 2 to 5 percent by weight measured as $Na_2O$.

2. Calcining the rare earth hydrogen exchanged faujasite at a temperature of from about 800° to 1,400° F. for a period of about 2 to 4 hours.

3. Exchanging the calcined rare earth exchanged faujasite with ammonium ions to reduce the sodium ion concentration to below about 0.5 percent by weight measured as $Na_2O$.

It is found that the rare earth hydrogen faujasite prepared by way of the above defined procedure will contain about 6 to 14 percent by weight $RE_2O_3$ and considerable amounts of hydrogen ion. The concentration of hydrogen ion present in the finished zeolite will be that concentration equivalent to the difference between the theoretical cation concentration of the particular faujasite in question and the amount of cation present in the form of rare earth and residual sodium ion. In other words, when a typical sodium faujasite having a silica to alumina ratio of about 5 is exchanged under the general conditions defined above to impart a 13 percent rare earth oxide concentration and a residual soda concentration of about 0.5 percent by weight, approximately 54 percent of the theoretical equivalent cation concentration will be provided by rare earth ion, about 4 percent of the theoretical cation concentration by sodium ion, and the remaining 42 percent equivalent cation requirement by hydrogen ion. solution, The rare earth-hydrogen exchanged faujasite produced by our process is found to possess a rare earth-hydrogen ion distribution within the faujasite crystalline structure which provides an exceptionally high degree of thermal stability and catalytic hydrocarbon cracking activity. Accordingly, the present rare earth-hydrogen faujasite finds utility as a hydrocarbon cracking catalyst or a hydrocarbon cracking catalyst ingredient when combined with conventional catalyst matrix components.

It is particularly noted that the present rare earth-hydrogen exchanged faujasites contain only 6 to 14 percent by weight rare earth oxide as opposed to conventional substantially fully rare earth exchanged faujasites which contain on the order of 15 to 20 percent by weight rare earth ions for a silica to alumina ratio of 3 or higher. Nevertheless, it is found that the present compositions possess thermal stability which is substantially equivalent to that of the fully rare earth exchanged faujasite.

The faujasite utilized in the preparation of our novel rare earth exchanged product is commercially available in the form of sodium or other alkali metal synthetic faujasites which will typically possess a silica to alumina ratio of from about 3 to 6. It is generally preferred, however, that the silica to alumina ratio of the faujasite utilized in the preparation of our product be in excess of about 4. The initial alkali metal faujasite will typically contain from about 12 to 18 percent by weight alkali metal measured as alkali metal oxides. As is well known to those skilled in the art, the precise alkali metal content varies according to the silica to alumina ratio of the faujasite and varies inversely to the silica alumina ratio thereof.

The initial step involved in the preparation of our novel rare earth hydrogen exchanged faujasite involves exchanging the initial alkali metal faujasite with rare earth ions under precisely controlled conditions of pH. More specifically, it is necessary to conduct the rare earth ion exchange step within the pH range of 3.0 to 3.5. This pH range is the pH of the exchange solution during exchange of the faujasite. In other words the initial pH of the aqueous slurry of sodium faujasite will possess a pH of about 10 to 12. The rare earth ion solution, when rare earth chlorides are utilized, will possess an initial pH of about 2.5 to 3.0. When the rare earth solution is combined with the faujasite slurry, the pH is then adjusted by the addition of mineral acid, if necessary, to the desired 3.0 to 3.5 range.

The rare earth ion utilized in the present process is preferably derived from rare earth chloride. However, it is also contemplated that rare earth nitrates may be utilized if desired. In general, the amount of rare earth ion necessary to conduct the required exchange in a single step will vary according to the pH of the exchange media. For example, at a pH of about 3.5 an excess of 10 to 15 percent by weight rare earth ion is desired to obtain the necessary degree of exchange. When a pH of 3.0 is utilized, the excess rare earth ion will increase to about 30 percent of the theoretical amount required. The present exchange is conducted at a temperature of from about 80 to 100° C. over a period of about 1 to 3 hours. After the exchange is completed, it is found the rare earth ion concentration in the faujasite will range from about 9 to 13 percent by weight measured as $RE_2O_3$ and the initial alkali metal concentration (usually sodium) will be reduced to about 3 percent by weight.

Subsequent to exchanging the faujasite with rare earth and hydrogen ions, the exchanged product is subjected to washing preferably with deionized water, to substantially remove all soluble anions such as chloride or nitrate. Subsequent to washing, it is generally preferred to dewater and dry the exchanged faujasite to a moisture content of about 20 to 25 percent by weight.

Subsequent to washing, the exchanged faujasite is calcined, i.e., heated, to a temperature of from about 800° to 1,400° F. for a period of from about 1 to 3 hours. The calcining step is conducted in the atmosphere, or in the presence of an inert gas if desired. Typical calcining temperatures are on the order of 1,000° F. and typical calcining periods on the order of 2 hours are preferred.

After calcination the faujasite is washed with ammonium ion, preferably ammonium sulfate, to reduce the alkali metal content thereof to a level of about 0.2 to 0.5 percent by weight measured as alkali metal oxide. The exchange solutions will preferably contain about 10 weight percent ammonium sulfate, and it is generally found that exchange periods of about 1 to 3 hours at temperatures of 80° to 100° C. will lower the alkali metal oxide to the desired level.

The final exchange may be conducted on the faujasite alone, or if preferred the faujasite may be incorporated in a conventional matrix such as amorphous silica-alumina hydrogel prior to final exchange. In such a procedure the residual soda is removed during the processing of the compounded catalyst.

The rare earth hydrogen faujasite produced by way of the present invention is found to be particularly effective as a hydrocarbon cracking catalyst. Hydrocarbon cracking catalysts, both of the fluid and moving bed types, are well known to those skilled in the art, and are generally utilized in the cracking of high molecular weight hydrocarbons to produce desired fractions of lower molecular weight. Typical cracking operations are conducted at a temperature of 850° to 1,000° F. using feedstocks of hydrocarbon petroleum fractions having boiling points on the order of 400° to 900° F. The products resulting from a typical cracking operation comprise gasoline, fuel oil and small amounts of coke, hydrogen and olefins.

When the present rare earth-hydrogen exchanged faujasites are utilized as a cracking catalyst, it is found that substantial amounts of gasoline are prepared along with desired amounts of $C_3$ and $C_4$ olefins. Furthermore, it is found that coke production as well as hydrogen production, is surprisingly low at relatively high levels of conversion.

The present rare earth hydrogen zeolites may be utilized as a cracking catalyst per se or the modified faujasite may be incorporated in a typical catalytic inorganic matrix. The catalyst matrix may comprise a silica, alumina, or silica-alumina hydrogel in combination with other natural or synthetic derivatives such as clay and modified clay. In general, it is found that when the presently modified faujasite is combined with a matrix, from about 10 to about 50 percent by weight of the modified faujasite will yield a catalyst having desired activity and selectivity characteristics. It is particularly noted that the present modified faujasites which contain from about 6 to 14 percent by weight rare earth as compared to conventional rare earth hydrogen exchanged faujasite which contains from about 15 to 20 percent rare earths exhibit thermal stability characteristics and activity characteristics as good as or superior to those of the fully rare earth exchanged products. It is noted that the low rare earth content which amounts to 25 to 50 percent lower than that of conventionally fully exchanged products, represents a substantial saving of expensive rare earth materials.

Having described the basic aspects of the present invention, the following examples are given to illustrate specific embodiments thereof.

EXAMPLE I

A series of rare earth hydrogen exchanged faujasite samples were prepared by reacting sodium Y faujasite having a silica to alumina ratio of about 5.3 with varying amounts of rare earth chloride ($RECl_3$) stock solution. The rare earth chloride solution contained 60 percent by weight $RECl_3 \cdot 6H_2O$. The rare earth distribution was 20 to 80 percent lanthanum ($La_2O_3$), 1 to 55 percent cerium (as $CeO_2$) and the remainder consisted of minor amounts of other rare earth ions. The samples were prepared by first slurrying a 50 gram sample of the sodium Y faujasite with about 150 ml. of water. This slurry was then combined with various amounts of the rare earth chloride stock solution indicated in Table I below, and subsequently heated at boiling for a period of 1 hour. Subsequent to exchange with rare earth chloride solution, the faujasite was recovered and washed with deionized water until it was substantially free of chloride ion. The washed faujasite was then heated at a temperature of 1,000° F. for a period of 3 hours. The heated, i.e., calcined, faujasite was then washed twice at boiling temperature with 1,000 ml. of ammonium sulfate solution which contained 100 grams ammonium sulfate per liter of water. Subsequent to washing, the samples were subjected to both thermal and steam stability test conditions. In Table I below the series of prepared samples are tabulated along with the thermal profile and steam stability characteristics thereof. In order to compare the present novel rare earth-hydrogen exchanged faujasite with conventional fully rare earth-hydrogen exchanged faujasite of the prior art, a standard sample of low soda, calcined rare earth exchanged Y (CREY) was prepared by the following procedure:

ninety g. dry basis of commercial NaY sieve was slurried in a commercial rare earth chloride solution diluted with deionized water to such a volume that the weight ratio of sieve:$RECl_3 \cdot 6H_2O$:water was 1:1:10. The slurry was then heated up to approximately 200° F. and kept for 30 minutes at that temperature under stirring. The sieve was filtered and reslurried in a fresh rare earth chloride solution, but this time the weight ratio of sieve:$RECl_3 \cdot 6H_2O$:water was 1:1:10. The slurry was kept at approximately 200° F. for one-half hour under stirring and filtered. The cake was washed chloride free by reslurrying several times in deionized water. Then it was dried in a draft furnace at 220° F. for 1 hour.

The dried cake was calcined at 1,000° F. for 3 hours in a muffle furnace. The calcined sieve was then blended in a 10wt percent ammonium sulfate solution. The resulting slurry had a weight ratio of sieve:ammonium sulfate: water of 1:2:20. The slurry was boiled for 1 hour with stirring and filtered. The ammonium sulfate treatment was repeated as described. The sieve was finally filtered, washed sulfate free and dried at 220° F. for 1 hour in a draft oven.

Analytical data: 16.65% $RE_2O_3$ (dry basis); 0.18% $Na_2O$ (dry basis); SA=835 m²/g.

TABLE I.—COMPOSITION AND STABILITY DATA FOR RE-H-Y SIEVES

| Sample No. | Ml. RE Cl₃ sol used per 50 g. of sieve | No. of RE exch. | Exch. pH | Percent RE₂O₃ before NH₄ exch. | Percent Na₂O before NH₄ exch. | Percent RE Cl₃ consumed (approx.) | Final percent RE₂O₃ | Comp. percent Na₂O | Thermal profile (SA in m.¹/g. at ° F., 2 hr.) 1,000 | 1,600 | 1,650 | 1,700 | Steam stability, 1,500°, 3 hr. (percent standard)* |
|---|---|---|---|---|---|---|---|---|---|---|---|---|---|
| 1 | 5 | 1 | 3.5 | 5.14 | 5.98 | 100 | 4.10 | 0.19 | 855 | 560 | 71 | <10 | 76 |
| 2 | 6 | 1 | 3.5 | 6.28 | 5.89 | 100 | 5.20 | 0.25 | 862 | 848 | 87 | <10 | 94 |
| 3 | 8 | 1 | 3.5 | 8.34 | 5.86 | 100 | 7.25 | 0.23 | 896 | 706 | 495 | 54 | 100 |
| 4 | 10 | 1 | 3.5 | 10.16 | 5.68 | 96 | 9.95 | 0.46 | 895 | 852 | 660 | 90 | 95 |
| 5 | 13 | 1 | 3.5 | 12.40 | 5.15 | 90 | 11.45 | 0.31 | 857 | 844 | 745 | 165 | 98 |
| 6 | 15 | 1 | 3.5 | 13.88 | 4.41 | 87 | 12.20 | 0.18 | 883 | 805 | 790 | 217 | 100 |
| 7 | 8 | 1 | 3.0 | 5.04 | 2.08 | 72 | 5.61 | 0.12 | 780 | 522 | 506 | <10 | 84 |
| 8 | 12 | 1 | 3.0 | 9.76 | 2.53 | 72 | 9.25 | 0.12 | 789 | 760 | 737 | <10 | 104 |
| 9 | 20 | 1 | 3.0 | 12.64 | 2.16 | 72 | 12.50 | 0.11 | 710 | 683 | 682 | <10 | 108 |
| 10 | 30 | 1 | 3.0 | 14.58 | 2.0 | 55 | 14.15 | 0.11 | 950 | 758 | 640 | <10 | 106 |
| 11 (standard)* | | | | | | | 16.65 | 0.18 | 934 | 692 | 632 | <10 | 100 |

*Standard is a commercial CREY sieve prepared as described in text.

The results summarized in Table I lead to the following conclusions:

1. RE—H—Y sieves with a rare earth content as low as 7 percent $RE_2O_3$ have a thermal and steam stability similar to that of Standard CREY. At lower rare earth levels the stability decreases.

2. The lowering of the exchange pH from 3.5 to 3.0 decreases significantly the amount of rare earth taken up by the sieve from the exchange solution. By carrying out the exchange at pH 3.5, 90 percent or more of the rare earth content of the solution is taken up by the sieve, resulting in sieves with up to 12% $RE_2O_3$ (Samples 1–5). Carrying out the exchange at pH 3.0 under otherwise equal circumstances, a significant excess of rare earth chloride solution is required to obtain sieves with the above rare earth content, since only 70 percent of the amount of rare earth in solution is taken up by the sieve (Samples 7–9). To obtain a sieve with approximately 14% $RE_2O_3$ at an exchange pH of 3.0 the required excess of rare earth chloride solution is almost twice the stoichiometric amount (see Sample 10).

3. The reduction of the exchange pH from 3.5 to 3.0 reduces also significantly the amount of sodium left in the sieve after the rare earth-hydrogen exchange. For instance, sieves with up to 12% $RE_2O_3$ prepared at a pH of 3.5, have a sodium level of 5 to 6% $Na_2O$; by increasing the silica-alumina ratio in the starting sieve, the residual sodium content will decrease to 3 or 4 percent. Sieves with the same rare earth content, prepared at a pH of 3.0, have a sodium level of 2.0 to 2.5% $Na_2O$. This is the result of more hydrogen ions being exchanged into the sieve at a lower pH.

In order to illustrate the catalytic characteristics of the present rare earth hydrogen exchanged faujasite, a series of catalyst samples were prepared using rare earth-hydrogen exchanged Y sieves similar to those prepared in Example I. The catalyst samples were prepared by physically blending 10 percent by weight of the exchanged faujasite (silica-alumina basis) with a semi-synthetic matrix which comprised a mixture of 60 percent by weight silica-alumina hydrogel (which contained 25 percent by weight alumina and 75 percent by weight silica) and 40 percent by weight kaolin clay. The catalytic data was obtained using a standard micro-activity catalytic cracking procedure using West Texas Devonian Gas Oil having a boiling range of 500° to 800°, a cracking temperature of 800° F. and a 16 weight hour space velocity. Prior to subjecting the samples to the micro-activity test samples were pretreated by heating to 1,000° F. for 3 hours. For purpose of comparing the catalytic characteristics of the novel compositions of the present invention with those of the prior art, a sample of conventional low sodium, calcined rare earth Y (CREY) was compounded into a similar catalyst composition. The catalytic activity and selectivity of numerous samples are set forth in Table II below.

The data summarized in Table II show that the activity of fresh promoters is very high (over 80 percent conversion). This is in line with previously established facts that the activity of fresh catalysts is only slightly affected by the amount of rare earth introduced into the sieve, as long as the sieve is stable under reaction conditions. An increase in rare earth from 4.1 (Sample 1) to 14.3 percent (Sample 7) in the promoter gives an increase in conversion from 82 to 88 percent. However, for sieves with a rare earth content higher than 10 percent the activity seems to level off at a value of 88 ± 2 percent conversion. This may be the result of "coke shut-off" at higher rare earth levels, due to the increase in coke yields with increasing rare earth content.

EXAMPLE III

To further illustrate the thermal stability of the present catalyst compositions a series of catalyst samples similar to those set forth in Example II were prepared. Prior to testing for micro-activity, these samples were subjected to a steam deactivation treatment which comprised treating the catalyst samples with 15 psig steam for 8 hours at 1,350° F. Also included was a standard sample of conventional CREY admixed with a similar matrix component. The results of the micro-activity test conducted on the steamed samples are set forth in Tables III and IV below. It is noted that samples set forth in Table III were prepared by exchanging the sodium faujasite at a pH of 3.5, whereas the examples set forth in Table IV were exchanged at a pH of 3.0.

Conversion. In the series of RE—H—Y sieves prepared at pH 3.5, the activity increases from 50 percent conversion for a sieve with 4.1% $RE_2O_3$ to 69 percent conversion for a sieve with 12.9% $RE_2O_3$. Sieves with 11.1 and 12.9% $RE_2O_3$ have practically the same activity and it is very close to that of CREY (68 and 69 vs. 70 percent conversion). As in the case of fresh catalysts, the activity of steamed catalysts have also a tendency to level off when the rare earth content of the sieve surpasses approximately 11% $RE_2O_3$. In this case a conversion of 69 ± 2 percent is obtained.

In the sieve series prepared at pH 3.0, the conversion is high for all the samples tested: it increases from 69 to 72 percent, as compared to 70 percent for CREY. Remarkable is the fact that even the sample with 9.5 percent $RE_2O_3$ has an activity practically equal to that of CREY. The samples with 12.0 and 13.4 percent $RE_2O_3$ have the same activity (72 percent conversion), which is slightly better than that of CREY.

$C_5^+$ Gasoline. The yield in $C_5^+$ gasoline increases in both series of samples with increasing rare earth content. In the series prepared at pH 3.5, an increase from 4.1 to 7.2 percent $RE_2O_3$ results in an increase of $C_5^+$ gasoline from 37 to 48 percent. However, sieves with 11 and 13 percent $RE_2O_3$ have identical $C_5^+$ gasoline yields (57 percent). These yields are slightly lower than that of CREY (59 percent).

TABLE II.—MICROACTIVITY DATA FOR RE-H-Y SIEVES WITH VARIABLE RE CONTENT (FRESH)

Starting sieve: NaY; exchange pH 3.5

Test conditions: 10 wt. percent blend S/S series "C"; 800/16 WHSV; pretreat: 1,000° F., 3 hours; WTD GO

| | Sample type | | | | | | | |
|---|---|---|---|---|---|---|---|---|
| | RE-H-Y | | | | | | | CREY |
| Sample number* | 1 | 2 | 3 | 4 | 5 | 6 | 7 | 8 |
| Composition promoter, percent: | | | | | | | | |
| $RE_2O_3$ | 4.10 | 5.2 | 7.25 | 9.95 | 12.20 | 13.15 | 14.36 | 17.9 |
| $Na_2O$ | 0.2 | 0.25 | 0.23 | 0.46 | 0.2 | 0.22 | 0.35 | 0.06 |
| SA (1,650°, 2 hrs.) m.²/g | 71 | 87 | 495 | 660 | 680 | 633 | 592 | 689 |
| Steam stability (CREY) | 76 | 95 | 100 | 95 | 100 | 96 | 97 | 100 |
| Conversion, v. percent | 82 | 85 | 85 | 87 | 87 | 88 | 88 | 89 |
| $H_2$, v. percent | 0.089 | 0.086 | 0.084 | 0.097 | 0.097 | 0.087 | 0.090 | 0.066 |
| $C_3^=$, v. percent | 3.5 | 4.0 | 3.8 | 3.7 | 3.3 | 2.8 | 3.4 | 3.9 |
| $C_3$ tot., v. percent | 11.75 | 12.4 | 12.2 | 11.9 | 12.9 | 10.8 | 13.6 | 11.1 |
| $C_4^=$, v. percent | 1.86 | 1.7 | 1.6 | 1.6 | 1.6 | 1.1 | 2.1 | 1.9 |
| i-$C_4$, v. percent | 17.2 | 17.8 | 18.1 | 18.3 | 19.7 | 16.4 | 19.9 | 17.2 |
| $C_4$ tot., v. percent | 22.6 | 23.2 | 23.8 | 24.1 | 25.9 | 35.8 | 26.6 | 22.9 |
| $C_5^+$ gaso., v. percent | 52.9 | 53.8 | 53.2 | 52.3 | 53.2 | 48.5 | 52.5 | 58.6 |
| $C_4^+$ gaso., v. percent | 75.5 | 77.0 | 77.0 | 76.4 | 79.1 | 84.3 | 79.0 | 81.5 |
| C on cat., v. percent | 2.0 | 2.1 | 2.2 | 2.6 | 2.3 | 2.2 | 2.4 | 2.2 |
| C on feed, v. percent | 11.6 | 12.5 | 12.9 | 15.4 | 13.6 | 13.0 | 13.8 | 13.0 |
| $C_5^+$ gaso./conv., v./v | 0.64 | 0.63 | 0.62 | 0.60 | 0.61 | 0.55 | 0.60 | 0.66 |
| $C_5^+$ gaso./coke, v./w | 4.55 | 4.3 | 4.1 | 3.4 | 3.9 | 3.7 | 3.8 | 4.5 |
| Conv./coke, v./w | 7.1 | 6.7 | 6.6 | 5.6 | 6.4 | 6.8 | 6.4 | 6.8 |

*Sample numbers 1–4, 5 and 8 correspond to sample numbers 1–4, 6 and 11 of Example I respectively.

TABLE III.—MICROACTIVITY DATA FOR RE-H-Y- SIEVES (EXCHANGE pH 3.5) (S-13.5 STEAM DEACTIVATED)

Test conditions: 10 wt. percent blend S/S series "C"; 900°/16 WHSV; S-13.5; WTDGO

| | Sample type | | | | | |
|---|---|---|---|---|---|---|
| | RE-H-Y | | | | | CREY |
| Sample Number* | 1 | 2 | 3 | 4 | 5 | 6 |
| Comp. promoter, percent: | | | | | | |
| RE₂O₃ | 4.10 | 5.20 | 7.25 | 11.15 | 12.95 | 17.9 |
| Na₂O | 0.2 | 0.25 | 0.23 | 0.5 | 0.4 | 0.06 |
| SA (1,650°, 2 hrs.) m.²/g | 71 | 87 | 495 | 427 | 600 | 689 |
| Steam stability (percent std. B) | 76 | 94 | 100 | 95 | 99 | 100 |
| Conversion, V. percent | 50 | 55 | 59 | 68 | 69 | 70 |
| H₂, v. percent | 0.064 | 0.038 | 0.035 | 0.043 | 0.048 | 0.035 |
| C₃⁻, v. percent | 5.0 | 5.3 | 5.6 | 6.9 | 6.5 | 5.3 |
| C₃ tot, v. percent | 6.0 | 6.3 | 6.7 | 7.9 | 7.7 | 6.5 |
| C₄⁻, v. percent | 3.8 | 4.4 | 4.6 | 4.3 | 4.4 | 3.3 |
| i-C₄, v. percent | 4.6 | 5.7 | 6.2 | 6.7 | 7.1 | 6.1 |
| C₄ tot., v. percent | 8.9 | 10.9 | 11.8 | 12.3 | 12.7 | 10.5 |
| C₅⁺ gaso., v. percent | 37.5 | 45.3 | 48.6 | 56.5 | 56.8 | 58.9 |
| C₄⁺ gaso., v. percent | 46.4 | 56.2 | 60.4 | 68.7 | 69.5 | 69.5 |
| C on cat., w. percent | 0.8 | 0.2 | 0.2 | 0.3 | 0.4 | 0.4 |
| C on feed, w. percent | 4.6 | 1.0 | 1.2 | 1.8 | 2.4 | 2.5 |
| C₅⁺ gaso./conv., v./v | 0.75 | 0.83 | 0.83 | 0.82 | 0.82 | 0.85 |
| C₅⁺ gaso./coke v./w | 4.1 | 46.4 | 38.7 | 31.9 | 23.5 | 23.1 |
| Conv./coke, v./w | 10.7 | 55.9 | 46.6 | 38.7 | 28.7 | 27.1 |

*Samples 1-3 and 6 correspond to Sample Numbers 1-3 and 11 of Example I.

TABLE IV.—MICROACTIVITY DATA FOR RE-H-Y SIEVES (EXCHANGE pH 3.0) (S-13.5 STEAM DEACTIVATION)

Test conditions: 10 wt. percent promoter in S/S series "C"; 900°/16 WHSV; S-13.5; WTDGO

| | Sample type | | | |
|---|---|---|---|---|
| | RE-H-Y | | | CREY |
| Sample number * | 1 | 2 | 3 | 4 |
| Comp. promoter, percent: | | | | |
| RE₂O₃ | 9.55 | 12.00 | 13.40 | 17.1 |
| Na₂O | 0.12 | 0.11 | 0.11 | 0.06 |
| SA (1,650°, 2 hrs.) m.²/g | 687 | 682 | 640 | 689 |
| Steam Stability (percent std. B) | 104 | 108 | 106 | 100 |
| Conversion, v. percent | 69 | 72 | 72 | 70 |
| H₂, v. percent | 00.03 | 0.03 | 0.03 | 0.03 |
| C₃⁻, v. percent* | 6.8 | 6.7 | 6.9 | 5.3 |
| C₃ tot., v. percent | 8.4 | 8.5 | 8.75 | 6.5 |
| C₄⁻, v. percent | 4.4 | 4.1 | 4.6 | 3.3 |
| i-O₄, v. percent | 8.3 | 8.1 | 8.8 | 6.1 |
| C₄ tot., v. percent | 14.0 | 13.6 | 15.0 | 10.5 |
| C₅⁺ gaso., v. percent | 55.9 | 57.3 | 57.9 | 58.9 |
| C₄⁺ gaso., v. percent | 69.9 | 70.0 | 72.9 | 69.5 |
| C on cat., v. percent | 0.3 | 0.6 | 0.4 | 0.4 |
| C on feed, w. percent | 2.0 | 3.6 | 2.2 | 2.5 |
| C₅⁺ gaso./conv., v./v | 0.81 | 0.79 | 0.81 | 0.85 |
| C₅⁺ gaso./coke, v./w | 28.0 | 15.9 | 26.35 | 23.1 |
| Conv./coke, v./w | 34.4 | 20.1 | 32.55 | 27.1 |

* Sample No. 4 corresponds to sample 11, of Example I.

In the series of sieves prepared at pH 3.0, an increase from 9.5 to 13.4% RE₂O₃ results in a C₅⁺ gasoline yield increase from 55.9 to 57.9 which is slightly lower than that of CREY.

The slight decrease in C₅⁺ gasoline yield obtained with RE—H—Y sieves at equal conversion with CREY, is primarily due to the increase in olefins and C₃ + C₄ hydrocarbons, C₃ and C₄ Olefins. All RE—H—Y sieves give higher yields in C₃ and C₄ olefins as compared to CREY. In the series obtained at pH 3.5, at practically equal conversion the samples with 11 and 13% RE₂O₃ show a C₃ olefin yield of 6.9 and 6.5 vs. 5.3 percent for CREY. For the C₄ olefins the yields are 4.3 and 4.4 vs. 3.3 percent.

A similar pattern is observed in the series prepared at pH 3.0. Samples with 9.5 and 13.4% RE₂O₃ give a C₃ olefin yield of 6.8 and 6.9 vs. 5.3 for CREY. The yield in C₄ olefins is 4.4 and 4.6 vs. 3.3 percent.

Total C₃ and C₄ Hydrocarbons. The yield in total C₃ + C₄ hydrocarbons is also considerably higher for all the RE═H—Y sieves tested as compared to CREY. Sieves prepared at pH 3.0 show generally a higher yield in C₃ + C₄ hydrocarbons than those prepared at pH 3.5. Remarkable is the increase in the yield of iso-C₄ hydrocarbons: 8.3, 8.1 and 8.8 vs. 6.1 percent for CREY.

The increase in C₃ + C₄ olefins as well as of iso-C₄ hydrocarbons is very advantageous due to their contribution to higher octane numbers of the gasoline fraction.

Coke Selectivity. The coke selectivity of all RE—H—Y sieves tested is similar or better than that of CREY. Since coke selectivity is improved by decreasing the rare earth content of the sieve, it is reasonable that RE—H—Y sieves have generally a better coke selectivity than CREY.

The above description and specific examples clearly indicate that the superior rare earth hydrogen exchanged faujasite may be obtained using the teachings of the present invention.

We claim:

1. A rare earth hydrogen faujasite containing 6 to 14 percent by weight rare earth ions measured as rare earth oxide prepared by the process which comprises:
   a. exchanging an alkali metal faujasite possessing a silica to alumina ratio of about 3 to 6 with a solution of rare earth ions at a pH of 3.0 to 3.5 to reduce the alkali metal oxide content of said faujasite to less than about 4 percent by weight,
   b. calcining the exchanged faujasite at a temperature of 800° to 1,400° F. for a period of about 1 to 3 hours, and
   c. exchanging said calcined faujasite with a solution of ammonium ions to reduce the alkali metal oxide content thereof to less than about 0.5 percent by weight.

2. The faujasite prepared by way of claim 1 wherein said rare earth ion solution is an aqueous solution of rare earth chlorides.

3. The faujasite prepared by way of claim 2 wherein said rare earth chloride solution contains from about 10 to 30 percent excess rare earth ion required to theoretically fully exchange the alkali metal ions of said faujasite.

4. The faujasite prepared by way of claim 1 wherein said rare earth exchange is conducted at a temperature of 60° to 105° C.

5. A method for preparing a rare earth-hydrogen faujasite which comprises:
   a. exchanging an alkali metal faujasite having a silica to alumina ratio of 3 to 6 with an aqueous solution of rare earth ions at a pH of 3.0 to 3.5 to reduce the alkali metal oxide of said faujasite to less than about 3 to 4 percent by weight,
   b. calcining said exchanged faujasite at a temperature of about 800° to 1,400° F. for a period of 1 to 3 hours, and
   c. exchanging said calcined faujasite with a solution of ammonium ion to reduce the alkali metal oxide content thereof to less than about 0.5 percent by weight.

6. The method of claim 5 wherein said exchange step (a) is conducted in an aqueous solution of rare earth chlorides.

7. The method of claim 6 wherein said rare earth chloride solution contains from about 10 to 30 percent by weight excess rare earth ion required to theoretically fully exchange the alkali metal ions of said faujasite.

8. The method of claim 7 wherein said exchange is conducted for a period of 0.5 to 3 hours at a temperature of 60° to 105° C.

9. A hydrocarbon conversion catalyst comprising the faujasite of claim 1.

10. The hydrocarbon conversion catalyst of claim 9 which contains from about 75 to 95 percent by weight of an inorganic oxide matrix.

11. The composition of claim 10 wherein said inorganic oxide matrix is selected from the group consisting of silica, alumina, silica-alumina, hydrogel, clay and mixtures thereof.

12. The composition of claim 11 wherein said matrix comprises silica-alumina hydrogel and clay.

* * * * *